US011205397B2

(12) United States Patent
Mu

(10) Patent No.: US 11,205,397 B2
(45) Date of Patent: Dec. 21, 2021

(54) DATA TRANSMISSION DEVICE AND DATA TRANSMISSION METHOD

(71) Applicants: GUANGZHOU SHIYUAN ELECTRONICS CO., LTD., Guangdong (CN); GUANGZHOU SHIRUI ELECTRONICS CO. LTD., Guangdong (CN)

(72) Inventor: Yanxiong Mu, Guangdong (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

( * ) Notice: Subject to any disclaimer, the term of this patent is extended or adjusted under 35 U.S.C. 154(b) by 0 days.

(21) Appl. No.: 16/937,438

(22) Filed: Jul. 23, 2020

(65) Prior Publication Data

US 2020/0357359 A1    Nov. 12, 2020

Related U.S. Application Data

(63) Continuation-in-part of application No. 16/650,212, filed on Mar. 24, 2020, and a continuation of
(Continued)

(30) Foreign Application Priority Data

Mar. 19, 2018    (CN) .......................... 201810226531.0

(51) Int. Cl.
*G09G 5/00* (2006.01)
*G06F 3/14* (2006.01)

(52) U.S. Cl.
CPC ........... *G09G 5/006* (2013.01); *G06F 3/1454* (2013.01); *G09G 2340/02* (2013.01); *G09G 2370/16* (2013.01); *G09G 2370/20* (2013.01)

(58) Field of Classification Search
CPC .............. G06F 3/1454; G09G 2370/10; G09G 2370/12; G09G 2370/20; G09G 5/006;
(Continued)

(56) References Cited

U.S. PATENT DOCUMENTS 8,390,467 B2    3/2013  Feldstein et al.
9,269,340 B2    2/2016  Udell, III
(Continued)

FOREIGN PATENT DOCUMENTS

CN    1605070 A     4/2005
CN    101677391 A   3/2010
(Continued)

OTHER PUBLICATIONS

International Application No. PCT/CN2019/078551, International Search Report and Written Opinion dated Jun. 14, 2019, pp. 8.
(Continued)

*Primary Examiner* — Charles V Hicks
(74) *Attorney, Agent, or Firm* — Zhong Law, LLC

(57) ABSTRACT

A data transmission device includes a TypeC interface, a wireless module, a first data transformation chip and a microprocessor, wherein the TypeC interface is connected with the first data transformation chip, the first data transformation chip is connected with the TypeC interface and the microprocessor, and the microprocessor is connected with the wireless module. When the TypeC interface of the data transmission device is inserted into a user's terminal device, the data transmission device automatically obtains media data presented on the screen of the terminal device, and transmits the media data being converted and compressed, using the wireless module, to a data receiving device for presentation of the media data.

22 Claims, 3 Drawing Sheets

Related U.S. Application Data application No. PCT/CN2019/078554, filed as application No. PCT/CN2019/078551 on Mar. 18, 2019.

(58) Field of Classification Search
CPC .......... G09G 2340/02; G09G 2370/00; G09G 2370/16
See application file for complete search history.

(56) References Cited

U.S. PATENT DOCUMENTS

| | | | |
|---|---|---|---|
| 10,701,426 B1* | 6/2020 | van Hoff | G06F 3/012 |
| 2003/0072429 A1 | 4/2003 | Slobodin et al. | |
| 2006/0154693 A1 | 7/2006 | Kogan | |
| 2012/0051716 A1 | 3/2012 | Ku | |
| 2016/0156137 A1 | 6/2016 | Pan et al. | |
| 2016/0217103 A1 | 7/2016 | Kim | |
| 2017/0152990 A1 | 6/2017 | Kielland | |
| 2017/0293347 A1 | 10/2017 | Wood, III et al. | |
| 2017/0302708 A1 | 10/2017 | Thomas et al. | |
| 2018/0131503 A1 | 5/2018 | Duan et al. | |
| 2019/0042503 A1 | 2/2019 | Montero et al. | |

FOREIGN PATENT DOCUMENTS

| | | |
|---|---|---|
| CN | 201479301 U | 5/2010 |
| CN | 101742097 A | 6/2010 |
| CN | 102209230 A | 10/2011 |
| CN | 102566960 A | 7/2012 |
| CN | 202383657 U | 8/2012 |
| CN | 102724474 A | 10/2012 |
| CN | 103428561 A | 12/2013 |
| CN | 103595944 A | 2/2014 |
| CN | 105045548 A | 11/2015 |
| CN | 105262974 A | 1/2016 |
| CN | 105898547 A1 | 8/2016 |
| CN | 205486071 U | 8/2016 |
| CN | 107333082 A | 11/2017 |
| CN | 107479847 A | 12/2017 |
| CN | 108810448 A | 11/2018 |
| CN | 208298174 U | 12/2018 |
| KR | 1020040068123 A | 7/2004 |
| KR | 1020140106551 A | 9/2014 |
| KR | 1020160092310 A | 8/2016 |
| WO | 2016061683 A1 | 4/2016 |

OTHER PUBLICATIONS

Korean Application No. 10-2020-7015080, Korean Office Action dated Feb. 19, 2021, pp. 1-15.
Sadat et al., Texas Instruments, "Alternate Mode for USB Type-C: Going beyond USB," Oct. 2016, 9 pages.
Analogix, "MIPI to DP Trasmitters", Wayback Machine, Jun. 12, 2021, 1 page.
Australian Application No. 2019239357, Examination Report dated Jul. 27, 2021, 5 pages.

* cited by examiner

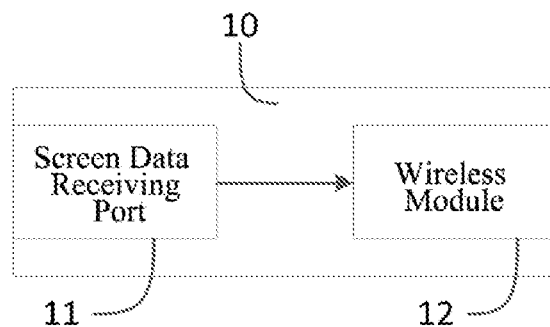
FIG. 1
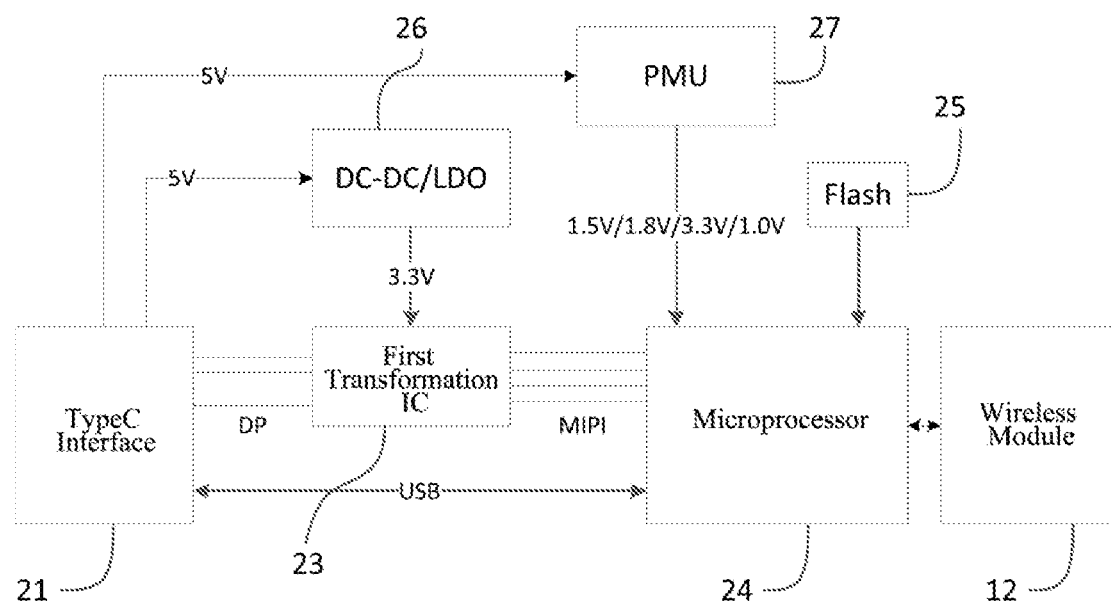
FIG. 2
FIG. 3

DATA TRANSMISSION DEVICE AND DATA TRANSMISSION METHOD

CROSS-REFERENCE TO RELATED APPLICATIONS

This application is a continuation of PCT/CN2019/078554 filed Mar. 18, 2019, which claims priority to Chinese application CN201810226531.0 filed Mar. 19, 2018, the contents of which are hereby incorporated by reference in their entireties. This application is a continuation-in-part of U.S. patent application Ser. No. 16/650,212 filed Mar. 24, 2020, which is a U.S. national stage application of PCT/CN2019/078551 filed Mar. 18, 2019, which claims priority to Chinese application CN201810226531.0 filed Mar. 19, 2018, the contents of which are hereby incorporated by reference in their entireties.

TECHNICAL FIELD

The present application relates to the technical field of intelligent conference and, in particular, to a data transmission device and a data transmission method.

BACKGROUND

To help people communicate and share information in a conference, current technologies provide different solutions including, for example, projecting a presentation onto a screen for showing and sharing, remote instant communication and providing writing canvas by a large-screen touch tablet and the like. Moreover, the screen of personal computer can be mirrored to a large format display screen in the conference room by using a wireless screen transmission device, but all of these above cannot provide with efficient solution for conference meeting.

SUMMARY

Embodiments of the present disclosure provide a data transmission device and a data transmission method.

Embodiments of the present disclosure provide a data transmission device, including a TypeC interface, a wireless module, a first data transformation chip and a microprocessor; the TypeC interface is connected with the first data transformation chip, the first data transformation chip is connected with the TypeC interface and the microprocessor, and the microprocessor is connected with the wireless module;

the TypeC interface is configured to receive media data in DP protocol format, where the media data is media content presented on a screen of a terminal device;

the first data transformation chip receives the media data in DP protocol format transmitted through the TypeC interface, and has the media data encoded into data in a first format;

the microprocessor is configured to receive the data in the first format, compress and encode the data in the first format into data in a second format;

the wireless module is configured to transmit the data in the second format to a data receiving device. The data in the first format include video data in MIPI format and/or audio data in I2S format. The data in the second format include video data in H.264/H.265 format and/or audio data in AAC format. Both of the data in the first format and the data in the second format adopt generic video/audio transmission protocol, so as to improve the versatility.

BRIEF DESCRIPTION OF DRAWINGS

FIG. 1 is a structural schematic diagram of an implementation of a peripheral device according to an embodiment of the present disclosure;

FIG. 2 is a structural schematic diagram of another implementation of a peripheral device according to an embodiment of the present disclosure;

FIG. 3 is an arrangement diagram of pins of a TypeC interface.

DETAILED DESCRIPTION

Figure 4:
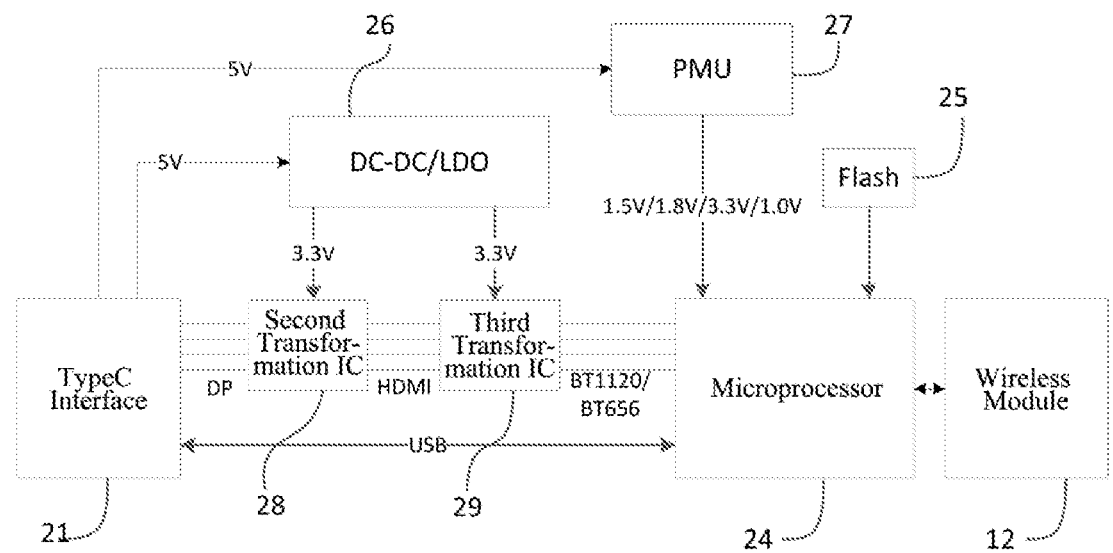
FIG. 4 is a structural schematic diagram of another implementation of a peripheral device according to an embodiment of the present disclosure.

The present disclosure may be further described in detail below with reference to the accompanying drawings and embodiments. It should be understood that the specific embodiments described herein are merely illustrative of the present disclosure but not intended to limit the present disclosure. Furthermore, it should be explained that only part of structures, but not all, related to the present disclosure are illustrated in the accompany drawings for descriptive convenience.

Besides, "first", "second", "third" and the like, as terms in the specification and the claims, are used merely for descriptive purpose of distinguishing the same technical features, and should not be understood as indicating or implying relative importance, or implicating the number of the technical features referred, and not necessarily for describing a sequence or a time sequence. In appropriate cases, the terms may be interchangeable. Therefore, features limited by "first" "second" can explicitly or implicitly include at least one of the features.

Similarly, "connect", also as a term being used in the specification and the claims, should not be understood as limited to a direct connection. Thus, an expression of "device A is connected with device B", should not be limited to a device or a system in which device A is directly connected to device B, but means that there's a path existed between device A and device B, where the path may include other devices or instruments.

A data transmission device works between a terminal device and a data receiving device. In the embodiments of the present disclosure, the data transmission device may be a wireless screen transmission device; the terminal device may be a personal computer, a PAD or a mobile phone; the data receiving device may be an interactive white board for conference meeting or a conference display device, to which embodiments of the present disclosure does not define a limitation. The wireless screen transmission device processes video/audio data presented on a screen of the device, so that the data can be presented on the data receiving device for viewing and sharing by many people.

FIG. 1 is a structural schematic diagram of an implementation of a peripheral device according to an embodiment of the present disclosure. The peripheral device 10 includes a screen data receiving port 11 and a wireless module 12. The screen data receiving port 11 is configured to be connected with a video signal interface of the terminal device, to obtain uncompressed first audio and video data output by the video signal interface; where the terminal device has a first processor, a video signal interface and a first display monitor. The first processor is installed with a first operating system, where the first operating system is pre-installed with a universal driver protocol for audio and video communication between the video signal interface and the peripheral device. The media content corresponding to the first audio and video data is the same as the media content displayed on the first display monitor. The screen data receiving port 11 is connected with the wireless module 12; the wireless module 12 is configured to communicate with a wireless communication network, and transmit the first audio and video data to a network node paired with the wireless module 12 in the communication network.

The terminal device, according to the specification and the claims, refers to a device including the first processor having the first operating system installed thereon and the first display monitor, such as a laptop, a mobile phone and a tablet computer. According to the feature described above, the process of audio and video communication between the video signal interface according to the embodiments of the present disclosure and the peripheral device is constrained by the universal driver protocol pre-installed in the first operating system, and thus the video signal interface can implement the audio and video communication with the peripheral device based on the pre-installed universal driver protocol, without the need for installing a driver in the first operating system. The audio and video communication includes outputting the audio and video data. Specifically, the terminal device generally has many interfaces set thereon, such as power source interfaces, USB interfaces, AUX interfaces, HDMI interfaces, or VGA interfaces, where the AUX interface is an audio interface. Based on the universal driving protocol pre-installed in the first operating system of the terminal device, when the peripheral device having the AUX interface (such as an earphone or a speaker) is connected with the terminal device via the AUX interface, the peripheral device can obtain the audio output to a loudspeaker by the first processor of the terminal device at that time. The video signal interface, such as the HDMI interface, the VGA interface or the DP interface, is the interface configured to transmit the audio and video data, and also operate based on the universal driving protocol pre-installed in the first operating system of the terminal device. That is, the audio and video data output by these video signal interfaces is in an audio and video data outputting format supported by the native system, and can be transmitted to the peripheral device without any transformation, such as the compression and encoding. When the peripheral device is connected with the terminal device via these video signal interfaces, the peripheral device can obtain the first audio and video data output by the processor of the terminal device at that time, where the media content corresponding to the first audio and video data is the same as the media content presented presently on the first display monitor. Therefore, in conclusion, the video signal interface referred in the embodiments of the present disclosure, is an interface that can directly output the uncompressed first video and audio data based on the universal driver protocol pre-installed in the operating system, which may be a HDMI interface, a VGA interface, a DP interface or the like on the terminal device. The screen data receiving port 11 is a corresponding interface connected with the video signal interface.

The wireless module 12 is a modular product implemented using wireless communication technology, which can transmit received signal to the wireless communication network in a wireless form, so that the signal can be captured by the network node in the wireless communication network. The examples may include the Wi-Fi module, the Bluetooth module, the ZigBee module or the like, which are widely used in short-distance LAN communication. The peripheral device provided in the present embodiment, includes the screen data receiving port 11 and the wireless module 12 which are connected with each other, and can directly obtain the screen data of the terminal device, and transmit it to other network nodes in the wireless communication network for displaying video screen. Generally, according to the common form of interface in the prior art, the screen data receiving port 11 on the peripheral device 10 is configured as a plug, and the video signal interface on the terminal device is configured as a socket. In the specification, for convenience of describing and explaining the technical solutions, the case in which the interface of the terminal device is a socket and the interface of the peripheral device is a plug may be taken as an example to describe the technical solution in details. In a conference scene, the screen data receiving port 11 of the peripheral device 10 can be inserted into the video signal interface of a personal computer, and a network node module of the large-screen display device used in conference can be paired and connected with the wireless module 12 of the peripheral device 10 in the same wireless communication network, then the audio and video data corresponding to the screen of the display monitor of the personal computer can be transmitted to the large-screen display device used in conference, thereby implementing the screen transmission, without the need to download the driving program at the personal computer.

Based on the solution described above, the peripheral device provided in the embodiments of the present disclosure may be realized using another implementation. The screen data receiving port 11 and the wireless module 12 are connected via a microprocessor, instead of connecting directly. Specifically, the microprocessor is connected with the screen data receiving port 11, and the microprocessor is configured to compress and encode the first audio and video data; the wireless module 12 is also connected with the microprocessor, and the wireless module 12 is configured to communicate with the wireless communication network, and transmit the first audio and video data to the network node paired with the wireless module 12 in the wireless communication network. Since the peripheral device performs the wireless screen transmission, where the wireless transmission may have strict requirements to the amount of transmitted data, and the wireless module needs to perform the work such as pairing with the network nodes in an external communication network. Therefore, it is generally necessary to add a microprocessor in the peripheral device, so that the peripheral device can have corresponding processing capacity.

FIG. 2 is a structural schematic diagram of another implementation of the peripheral device provided by an embodiment of the present disclosure. The peripheral device may be a data transmission device, and may also be a wireless screen transmission device, to which the embodiment of the present disclosure does not impose a limitation.

Based on the technical solution describes above, this implementation provides a plurality of modified solutions for the type of the screen data receiving port and the internal structure of the peripheral device. It should be noted that a plurality of modified solutions described below can be freely combined to form further preferred solutions according to actual demands, in the case that essential conditions are available and no contradictions exist between these modified solutions.

A first modification of the implementation is that: designing a TypeC interface 21 shown in FIG. 2 for the data transmission device, where a differential signal transmission pin in the TypeC interface 21 is the screen data receiving port. The uncompressed first audio and video data output by the video signal interface of the terminal device include the audio and video data in DP form, and the video signal interface may be the TypeC interface.

The data transmission device is used in conference, teaching, medical consultation or other sharing scenarios among many people, and mainly used for transmitting sound and image screen or media content from the user's terminal device (for example, computer, tablet, mobile phone and the like installed with the system such as windows, mac and Linux, which is referred to as terminal device hereinafter) to a large screen or a large touch-screen (such as interactive white board) for showing and sharing. Also, the data transmission device provided in the present embodiment, can transmit sound and image screen and media content at the terminal device to the large screen or the large touch-screen, without installing a specific driver (such as screen-capture program) in the user's terminal device. Alternatively, the data transmission device provided in the present embodiment, receives the sound and image screen and media content from the terminal device, via drivers and interfaces pre-installed in the system of the terminal device itself. The data transmission device includes the above-mentioned TypeC interface 21, i.e. USB-Type-C, which is referred to as TypeC interface 21 hereinafter. USB-Type-C is a hardware interface protocol for the universal serial bus, which has a faster transmission speed (10 Gbps in the fastest), and a more powerful power transmission (100 W at the highest), and is compatible with USB2.0, USB3.0 and DP (DisplayPort). The TypeC interface 21 has 24 pins in total, including two lines of pins having the same function, which support a forward direction insertion and a reverse direction insertion. Referring to FIG. 3, pins from A1 to A12 as shown in FIG. 3 is one of these two lines, and pins B1 to B12 is the other. The TypeC interface 21 includes two pairs of power pins, four pairs of differential pins and a CC pin configured for a pairing communication when an insertion pairing is performed. Two pairs of power pins are detailed as A9, B4, B9, A4 in FIG. 3, and four pairs of differential pins are detailed as A11, B2, A10, B3, A4, B10, A2, B11 in FIG. 3, and the CC pin is detailed as A5 in FIG. 3. Where, TX+, TX−, RX+ and RX− in every group of pins are differential signal transmission pins, and every group of differential signal transmission pins support to operate in a USB mode or a DP (DisplayPort) mode. When the pairs of differential signal transmission pins operate in the USB mode, the pairs of signal transmission pins transmit USB3.0 signal; when the pairs of differential signal transmission pins operate in the DP mode, the pairs of signal transmission pins are used as DP (DisplayPort) interfaces.

As an alternative embodiment, the solutions according to the embodiments of the present disclosure can be implemented by the method below:

1) connecting the TypeC interface and a TypeC receiving port of the terminal device to turn on the power;

Specifically, when the TypeC interface 21 of the data transmission device is inserted into the TypeC receiving port of the user's terminal device, the terminal device may supply a basic operation voltage, which may be 5V or other amount, to the data transmission device via the power pins of the TypeC receiving port, and then the data transmission starts to operate under the supplying of the basic voltage. It should be noted that the TypeC receiving port may be the USB-Type-C interface. Specifically, in the embodiments of the present disclosure, the TypeC interface may be a hardware interface having pins as shown in FIG. 3; particularly, the TypeC interface can supply power to the data transmission device via the power pins A9, B4, B9 and A4. It should be noted that the above-mentioned connection may be a direct connection or an indirect connection, to which the present embodiment imposes no limitation.

2) transmitting a request signal to the terminal device via the paring communication pins of the TypeC interface, where the request signal is used for requesting the terminal device to transmit the media data in DP protocol format to at least one pair of differential signal transmission pins;

Specifically, after the data transmission device being powered on, the terminal device may transmit an inquiry data packet, which may be a VDM (Vendor Defined Message) signal, via the CC pin of the USB-Type-C interface to the data transmission device. After receiving the VDM signal, the data transmission device may transmit a response to the terminal device via the CC pin in the TypeC interface thereon, the response carry's information indicating that the current operation mode or the supported operation mode of the data transmission device is the DP (DisplayPort) mode, the response may also contains information like a specific range of supplied power of the data transmission device. After the terminal device receives the response transmitted by the data transmission device, the terminal device modifies the voltage of power supplied to the data transmission device according to the specific range of supplied power; and in the meanwhile, the terminal device, when recognizing that the current operation mode or the supported operation mode of the data transmission device is the DP (DisplayPort) mode, sets the USB-Type-C interface of the terminal device to operate in the DP (DisplayPort) mode, invokes the DP driver pre-installed in the operating system thereof, and transmits the media content including audio and video to the data transmission device via the pairs of differential pins in the USB-Type-C interface of the terminal device. The media content may be the media data in DP protocol format, and the media content includes but not limited to the content displayed on the display monitor.

3) receiving the media data in DP protocol format via differential signal transmission pins, where the media data includes at least one of the video data or the audio data from the terminal device;

Specifically, in the embodiments of the present disclosure, the differential signal transmission pins are used for transmitting differential signals, and optionally, in the embodiments of the present disclosure, referring to FIG. 3, the differential signal transmission pins may include four pairs of differential pins, which are detailed as A11, B2, A10, B3, A4, B10, A2 and B11 in FIG. 3.

4) transforming the media data into the data in the first format;

Specifically, the step is optional. If the microprocessor of the data transmission device does not support the direct transformation of the media data in DP protocol format into the data in H.264/H.265 format and/or the data in AAC format, the data transmission device needs to convert the media data in DP protocol format into the data in a format that can be processed by the microprocessor in advance. Specifically, a data transformation chip, which can convert the media data in DP protocol format into the video data in MIPI format and/or the audio data in I2S format, may be added into the data transmission device. MIPI (Mobile Industry Processor Interface), an open standard and a protocol initialed by MIPI alliance for mobile application processor, is mainly used for a standardized integration for interfaces of mobile device, including camera, display interface, radio frequency/baseband interface and the like. I2S (Inter-IC Sound) bus is specifically used for data transmission between audio apparatuses.

5) compressing and encoding the data in the first format into the data in a second format according to an encoding scheme, where the data in the second format is a compressed media data stream;

Specifically, if the step 4) is required, compress the video data in MIPI format and/or the audio data in I2S format into data in H.264/H.265 format and/or data in AAC format, by the microprocessor; if the step 4) is not required, the media data in DP protocol format can be compressed directly into data in H.264/H.265 format and/or data in AAC format. The compressed data may occupy less bandwidth, and thus can transmit more data under the same transmission requirements.

6) transmitting the compressed media data stream via the communication network;

Specifically, the compressed data may be transmitted to the large-screen display device via the wireless network for displaying. Optionally, the wireless network may be a Wi-Fi network, a 3G/4G/5G communication network, or other networks having the function of transmitting data. The present embodiment imposes no limitation to the type of the wireless network.

Optionally, before compressing the video data in MIPI format and/or the audio data in I2S format, or before compressing the media data in DP protocol format, receiving a screen transmission sharing instruction from the user, compressing the above-mentioned data according to the screen transmission start instruction input by the user, and transmitting the compressed data to the large-screen display device via the wireless network for displaying.

Optionally, before receiving the screen transmission start instruction from the user, discarding received video data in MIPI format and/or audio data in I2S format, or media data in DP protocol format, without performing compressing or transmitting treatment, thereby saving the resource of the microprocessor of the data transmission device.

7) receiving the touch signal from the large-screen display device, and transmitting the touch signal to the terminal device.

Specifically, in a scenario of conference, the large-screen display device has a function of touch controlling, and can instantly receive a touch controlling operation from users. The large-screen display device transforms the touch controlling operation into a touching signal, and transmits the touch signal to the data transmission device via the wireless network. The data transmission device transmits the touch signal to the terminal device, and the terminal device responds to the touch signal or starts corresponding application programs according to the touch signal, to realize a touch post-back function and improve human-machine interaction experiences.

In the embodiments of the present disclosure, since the operating system of the terminal device support transmitting the audio and video data via DP (DisplayPort) interface. Therefore, by way of redesigning the wireless screen transmission device so that the wireless screen transmission is connected with the TypeC interface of the terminal device via the TypeC interface of the wireless transmission device itself, the terminal device directly transmits the media data in DP protocol format to the wireless screen transmission device via the TypeC interface. In the DP (DisplayPort) operation mode, without installing a specific driver, the terminal device can perform a driver-free transmission of the media content containing audio and video data to the wireless screen transmission device, thereby saving the time for transmitting the driver from the wireless screen transmission device to the terminal device, and saving the time of installing the driver in the terminal device, and thus improving conference efficiency.

Besides, in the present embodiment, the terminal device transmits the audio and video data to the data transmission device via the DP (DisplayPort) interface. The DP (DisplayPort) interface has a large data bandwidth, which supports a bandwidth of up to 40G, and the DP (DisplayPort) interface transmits uncompressed data. Compared with other compression technology such as H.264, the data transmitted via the DP (DisplayPort) interface has a higher image quality.

Optionally, when it is required to transform the media data in DP protocol format into the video data in MIPI format and/or the audio data in I2S format, and then compress the video data in MIPI format and/or the audio data in I2S format, the solutions provided by the present embodiment can be implemented by setting a data transformation chip which can have DP protocol run thereon in the data terminal device. In the embodiments of the present disclosure, the case in which the data terminal device is the wireless screen transmission device is taken as an example for description. The wireless screen transmission device includes the TypeC interface, the wireless module, the data transformation chip and the microprocessor; the TypeC interface is connected with the data transformation chip, the data transformation chip is connected with the TypeC interface and the microprocessor respectively, the microprocessor is connected with the wireless module. The specific implementation is as below:

1) connecting the TypeC interface and a TypeC receiving port of the terminal device to turn on the power;

Specifically, when the TypeC interface 21 of the wireless screen transmission device is inserted into the TypeC receiving port of the user's terminal device, the terminal device may supply a basic operation voltage, which may be 5V or other amount, to the data transmission device via the power pins of the TypeC receiving port, and then the data transmission starts to operate under the supplying of the basic voltage. It should be noted that the TypeC receiving port may be the USB-Type-C interface. Specifically, in the embodiments of the present disclosure, the TypeC interface may be a hardware interface having pins as shown in FIG. 3; particularly, the TypeC interface can supply power to the data transmission device via the power pins A9, B4, B9 and A4. It should be noted that the above-mentioned connection may be a direct connection or an indirect connection, to which the present embodiment imposes no limitation.

2) transmitting a request signal, by the data transformation chip of the wireless screen transmission device, to the terminal device via the paring communication pins of the TypeC interface, the request signal is used for requesting the terminal device to transmit the media data in DP protocol format to at least one pair of differential signal transmission pins;

Specifically, after the data transmission device powered on, the terminal device may transmit an inquiry data packet, which may be a VDM (Vendor Defined Message) signal, via the CC pin of the USB-Type-C interface to the data transmission device. After receiving the VDM signal, the data transmission device may transmit a response to the terminal device via the CC pin in the TypeC interface thereon, the response carry's information indicating that the current operation mode or the supported operation mode of the data transmission device is the DP (DisplayPort) mode, the response may also contains information like a specific range of supplied power of the data transmission device. After the terminal device receives the response transmitted by the data transmission device, the terminal device modifies the voltage of power supplied to the data transmission device according to the specific range of supplied power; and in the meanwhile, the terminal device, when recognizing that the current operation mode or the supported operation mode of the data transmission device is the DP (DisplayPort) mode, sets the USB-Type-C interface of the terminal device to operate in the DP (DisplayPort) mode, invokes the DP driver pre-installed in the operating system thereof, and transmits the media content including audio and video to the data transmission device via the pairs of differential pins in the USB-Type-C interface of the terminal device. The media content may be the media data in DP protocol format, and the media content includes but not limited to the content displayed on the display monitor.

3) receiving, by the data transformation chip of the wireless screen transmission device, the media data in DP protocol format via differential signal transmission pins, where the media data includes at least one of the video data or the audio data from the terminal device;

4) transforming, by the data transformation chip of the wireless screen transmission device, the media data into the data in the first format, according to the preset encoding scheme;

Specifically, the data transformation chip of the wireless screen transmission device converts the media data in DP protocol format into the video data in MIPI format and/or the audio data in I2S format.

5) transmitting, by the data transformation chip of the wireless screen transmission device, the video data in MIPI format and/or the audio data in I2S format to the microprocessor of the wireless screen transmission device;

6) starting, by the microprocessor of the wireless screen transmission device when receiving the screen transmission instruction output by the user, to compress the video data in MIPI format and/or the audio data in I2S format to data in H.264/H.265 format and/or data in AAC format; otherwise, discarding the video data in MIPI format and/or the audio data in I2S format; Specifically, the microprocessor of the wireless screen transmission device may receive the screen transmission instruction via a screen transmission key of the wireless screen transmission device; where the screen transmission key may be a hardware key disposed on a top surface or a side surface of the wireless screen transmission device; the screen transmission key may also be a software key implementing by a program, which is disposed on an interface of a display monitor of the wireless screen transmission device, or disposed on a display interface of the terminal device. By clicking the software key, the user can start the compression and encoding of the video data in MIPI format and/or the audio data in I2S format.

7) transmitting the compressed media data stream via the communication network;

Specifically, the compressed data in H.264/H.265 format and/or in AAC format may be transmitted to the large-screen display device via the wireless network for displaying. Optionally, the wireless network may be a Wi-Fi network, a 3G/4G/5G communication network, or other network having the function of transmitting data. The present embodiment imposes no limitation to the type of the wireless network.

8) receiving the touch signal from the large-screen display device, and transmitting the touch signal to the terminal device.

Specifically, in a scenario of conference, the large-screen display device has a function of touch controlling, and can instantly receive a touch controlling operation from user. The large-screen display device transforms the touch controlling operation into a touching signal, and transmits the touch signal to the data transmission device via the wireless network. The data transmission device transmits the touch signal to the terminal device, and the terminal device responds to the touch signal or starts corresponding application programs according to the touch signal, to realize a touch post-back function and improve human-machine interaction experiences.

In the embodiments of the present disclosure, since the operating system of the terminal device support transmitting the audio and video data via DP (DisplayPort) interface. Therefore, by way of redesigning the wireless screen transmission device so that the wireless screen transmission is connected with the TypeC interface of the terminal device via the TypeC interface of the wireless transmission device itself, the terminal device directly transmits the media data in DP protocol format to the wireless screen transmission device via the TypeC interface. In the DP (DisplayPort) operation mode, without installing a specific driver, the terminal device can perform a driver-free transmission of the media content containing audio and video data to the wireless screen transmission device, thereby saving the time of transmitting the driver from the wireless screen transmission device to the terminal device, and saving the time of installing the driver in the terminal device, and thus improving conference efficiency.

Besides, in the present embodiment, the terminal device transmits the audio and video data to the data transmission device via the DP (DisplayPort) interface. The DP (DisplayPort) interface has a large data bandwidth, which supports a bandwidth of up to 40G, and the DP (DisplayPort) interface transmits uncompressed data. Compared with other compression technology such as H.264, the data transmitted via the DP (DisplayPort) interface has a higher image quality.

Since the TypeC interface 21 also has power signal transmission pins $V_{BUS}$ (A9, B4, B9, A4) as shown in FIG. 3, without setting an additional interface for connecting with the power source, the TypeC interface 21 can obtain the power signal of the terminal device and supply power to the components such as the microprocessor 24 of the peripheral device that need to be powered. In addition, the TypeC interface 21 also has USB2.0 data transmission pins D+ and D− as shown in FIG. 3, these two pins can be used for transmitting other data. Therefore, according to the present embodiment, the peripheral device includes the TypeC interface 21. Using the differential signal transmission pins of the TypeC interface 21 as the screen data receiving port, has an advantage of enriching the functions of the peripheral device. The data transmission device also includes a first converter IC23, i.e. a first data transformation chip, which is configured to transform the media data in the data packet corresponding to the DP (Displayport) protocol received from user's terminal device, to data in a format that is suitable for the microprocessor for further transformation. Specifically, the first data transformation chip can transform the video part of the media content into the data in MIPI format, and transform the audio part of the media content into the data in I2S format. The data in MIPI format and the data in I2S format are referred to as the data in the first format. The MIPI video data may include image frame sequence, in which a pixel is represented in the form of YUV; and the I2S audio signal may be presented in pulse-code modulation (PCM) format. The media data in these two formats can be provided to the microprocessor 24, after the format transformation being performed via the first data transformation chip. In a specific embodiment, the microprocessor 24 is a hardware processor (such as ARM processor), and can be programmed to support a video/audio encoder to compress the video data and audio data. The microprocessor 24 may encode the MIPI video data according to a video compression standard (such as H.264 and H.265), and encode the I2S audio data according to an audio compression standard (such as OPUS audio encoding and decoding standard, MP3 standard, and ACC), both of the encoded data are referred to as the data in the second format.

The microprocessor 24 transmits the encoded video data and the encoded audio data to the wireless module 12. The wireless module 12 specifically is a first wireless transmitter/receiver. The wireless module 12 can transmit the encoded and compressed video data and audio data to a second wireless transmitter/receiver of a large-format screen or a large-format touch screen paired with the data transmission device. The wireless module 12 may include a wireless network card paired with the wireless network, which is configured to communicate with the second wireless transmitter/receiver connected with the large-format touch screen. Therefore, the user does not have to execute any network configuration on the terminal device. The processor associated with the large-format screen or the large-format touch screen can execute a decoder program, which can transform the compressed video data and the compressed audio data into a format that is suitable for displaying on the screen, and thus the large-format screen or the large-format touch screen can display the same media content as that on the user's terminal device. Therefore, without uploading or installing specific program on the terminal device. User can complete the sharing process, just by inserting the data transmission device into the USB-Type-C interface of the terminal device.

Specifically, the present embodiment also includes a trigger device connected and paired with the microprocessor 24. By way of controlling the trigger device, the user can control the work state of the microprocessor 24 and the wireless module 12, and freely participate in or drop out the sharing. For example, when the user generates the first user operation for instructing to share the screen transmission via the trigger device, the microprocessor responds to the trigger of the trigger device, and thereby starts to compress and encode the video data and audio data, and transmits the compressed and encoded video data and audio data to the large-format screen or the large-format touch screen via the wireless module 12; or, when the user generates the second user operation for instructing to stop the screen transmission via the trigger device, the microprocessor responds to another trigger of the trigger device, and thereby stops compressing and encoding the video data and audio data, stops transmitting the compressed and encoded video data to the large-format screen or the large-format touch screen via the wireless module 12, and discards the video data and audio data received from the first data transformation chip. Specifically, the trigger device may be a hardware or a virtual key, and may be integrated with the data transmission device or separately disposed with the data transmission device. For example, the trigger device may be an infrared remote controller paired with the data transmission device.

In the present embodiment, the specific process of implementation is as below:

100, the data transmission device is connected, via the Type C interface 21, with the USB-Type-C interface of the user's processing device (such as personal computer or smart mobile phone, which is also referred to as the user's terminal device). Responsive to the insertion of the data transmission device, the processing device supplies a basic operation voltage to the data transmission device via the power pins of the USB-Type-C interface, and the first data transformation chip and the microprocessor of the data transmission are powered on, operating under the basic voltage. A configuration pin (CC pin) of the USB-Type-C interface of the processing device and the CC pin of the TypeC interface 21 of the data transmission device (which is detailed as A5 in FIG. 5) are electrically connected with each other.

200, the processing device transmits an inquiry data packet via the CC pin of the USB-Type-C interface to the data transmission device, the inquiry data packet may be a VDM signal.

300, after receiving the VDM signal, the data transmission device transmits a response to the terminal device via the CC pin of the TypeC interface 21, where the response carry's information indicating that the operation mode of the data transmission device is supporting for the DP (DisplayPort) mode, information indicating a specific range of operation voltage and the like.

400, the processing device modifies the operation mode of the USB-Type-C interface according to the response, which specifically includes:

the processing device modifies the operation voltage of the data transmission device according to the range of operation voltage of the data transmission device, via the power pins of the TypeC interface 21 (which are detailed as A9, B4, B9 and A4 in FIG. 3) which are matched with the USB-Type-C interface;

the processing device invokes a DP (DisplayPort) pre-installed driver in its operating system, obtains the media content containing the media data including video data and audio data from a video memory, and encapsulates the media data according to a DP (DisplayPort) protocol, and transmits the media data to the pair of differential signal transmission pins of the TypeC interface via the differential signal transmission pin of the USB-Type-C interface.

Specifically, the media content includes but not limited to audio and video content displayed on the screen of the processing device.

Meanwhile, the processing device modifies the differential pins of the USB-Type-C interface to operate in the DP (DisplayPort) mode. In the present embodiment, four pairs of differential pins in the TypeC interface, which are detailed as A11, B2, A10, B3, A4, 10, A2 and B11 in FIG. 3, all operate in the DP (DisplayPort) mode, and output display signal according to the DP ((DisplayPort) protocol. Four pairs of differential pins operate at the same time, which can achieve a better transmission bandwidth. In other cases, under the condition that a requirement for the transmission bandwidth is met, one pair, two pairs or three pairs of differential pins may be used for transmitting, which can be modified according to specific operation conditions.

500, the first data transformation chip of the data transmission device receives the data packet of media content in DP (DisplayPort) protocol format from the processing device, via four pairs of differential pins of the TypeC interface 21, which are detailed as A11, B2, A10, B3, A4, 10, A2 and B11 in FIG. 3. The first data transformation chip can transform the video part of the media content into the data in MIPI format, and transforms the audio part of the media content into the data in I2S format, and transmits the transformed data to the microprocessor 24.

600, the microprocessor 24 of the data transmission device receives a screen transmission triggering signal from the trigger device, the microprocessor 24 encodes the MIPI video data according to the video compression standard (such as H.264 and H.265), and encodes the I2S audio data according to an audio compression standard (such as OPUS audio encoding and decoding standard, MP3 standard, and ACC), and transmits the compressed and encoded video data via the wireless module 12 to the large-format display monitor or large-format touch display monitor that has been paired with the wireless module 12. In the present embodiment, by way of a Wi-Fi protocol, the wireless module 12 communicates with the large-format display monitor or the large-format touch display monitor.

700, the large-format display monitor or the large-format touch display monitor receives the compressed and encoded media content, via the second wireless transmitter/receiving port paired with the wireless module 12, and performs decoding and display.

800, the microprocessor 24 of the data transmission device receives a screen transmission stop signal from the trigger device, the microprocessor 24 stops compressing and encoding the video data and audio data, and stops transmitting the compressed and encoded video data and audio data to the large-format screen or the large-format touch screen via the wireless module 12, and discards the video data and audio data received from the first data transformation chip.

On this basis, embodiments of the present disclosure include a further modified optional solution, in which the microprocessor 24 in the peripheral device includes a first data input port, a second data input port and a wireless module connection port; where, the first data input port is connected with the differential signal transmission pins, the wireless module connection port is connected with the wireless module 12; the USB2.0 data transmission pin included in TypeC interface 21 is configured to connect a corresponding pin of the processing device. The corresponding pin referred to as the interface pin can be paired and connected with each other with a pin having the same function. The USB2.0 interface, USB3.0 interface and TypeC receiving port in the processing device have USB2.0 data transmission pins D+ and D−, which are corresponding to USB2.0 data transmission pins of the TypeC interface 21 of the peripheral device. By way of direct inserting or connecting an interface converter, the USB2.0 data transmission pins of the TypeC interface 21 can be connected with the corresponding pins of the processing device.

The second data input port is connected with the USB2.0 data transmission pins of the TypeC interface 21. That is, in the modified solution, the microprocessor 24 also has functions of extending ports, establishing a connection path between the differential signal transmission pins of the TypeC interface 21 and the wireless module 12, and establishing a connection path between the USB2.0 data transmission pins of the TypeC interface 21 and the wireless module 12. When the TypeC interface 21 of the peripheral device is inserted into the TypeC socket of the processing device, the differential signal transmission pins and the USB2.0 data transmission pins are connected with the corresponding pins of the processor, and thus can transmit not only video data but also other encoded USB2.0 data, such as specified documents, images, application programs or human-machine interaction control data. Therefore, the functions of the peripheral device are further enriched.

On this basis, the present embodiment includes a further modified optional solution. The wireless module 12 is also configured to receive a screen control signal transmitted by the network node in the wireless communication network which is paired with the wireless module 12; the microprocessor 24 is also configured to encapsulate the signal from the wireless module 12, which is from the wireless module 12 and input via the wireless module connection port, into a HID equipment output signal, that is, to simulate the signal into a signal output by a HID (Human Interface Device), and output the HID output signal via the second data input port, thereby transmitting the HID output signal to the, via the USB2.0 data transmission pins of the TypeC interface 21 and the corresponding pins of the processing device.

In the modified solution, the transmission path which is from the wireless module 12, passing by the microprocessor 24, to the USB2.0 data transmission pins of the TypeC interface 21 is configured to transmit the screen control signal. In a scenario of conference, it is a specifically useful function that transmits the screen control signal of a large-screen display device back to a signal source so that the signal source modifies the screen image according to the screen control signal. In the present embodiment, the rich functionalities of the TypeC interface 21 pins are used for implementing screen transmission and transmitting back the screen control signal, and thus users can manipulate the personal computer on the large-screen display device when the peripheral device is applied in the scene of conference, thereby operating a content presentation on the large-screen display device more freely and improving the conference efficiency. And in the modified solution, the microprocessor 24 is also configured to encapsulate the signal transmitted by the wireless module 12 into a HID output signal. That is, the microprocessor 24 is simulated as the HID such as keyboard, and the processing device can directly process the HID output signal so that a driver is not required for parsing the screen control signal, thereby improving the efficiency of transmitting back and controlling the screen control signal.

On this basis, the present embodiment of the present disclosure includes a further modified optional solution, in which the peripheral device also includes a memory 25; the memory 25 stores an executable program; after being downloaded to the processing device, the executable program is run by the first processor to compress the second audio and video data, which is output by the first processor to the first display monitor at that time, into the USB2.0 data, and output the USB2.0 data via the corresponding pins of the processing device. That is, after the executable program is downloaded at the processing device, the audio and video data can be transmitted via the transmission path which is from the USB2.0 data transmission pins, passing by the microprocessor 24, to the wireless module 12.

The executable program is stored in the memory 25 of the peripheral device; therefore, the executable program can be conveniently obtained during use. Specifically, the microprocessor 24 is also configured to obtain the executable program from the memory 25 when being triggered, and output the executable program via the second data input port, so that the executable program can be transmitted to the processing device via the USB2.0 data transmission pins of the TypeC interface 21. The microprocessor 24 is also configured to encode the USB2.0 data received by the second data input port to get the third audio and video data, output the third audio and video data via the wireless module connection port, so that the wireless module 12 receives the third audio and video data. The wireless module 12 is also configured to transmit the received third audio and video data to the network node in the wireless communication network which is paired with the wireless module 12.

It should be noted that, the pins of the processing device corresponding to the USB2.0 data transmission pins of the TypeC receiving port may be pins in the TypeC socket, and may also be pins in a USB2.0 socket or a USB3.0 socket. When the processing device has the TypeC socket, the TypeC interface 21 of the peripheral device can be directly inserted into the socket, the video data in DP protocol format can be transmitted by using the differential signal transmission pins, the USB2.0 data transmission pins of the peripheral device and the processing device can be connected correspondingly to transmit other data. When the has no TypeC socket, but only has the USB2.0 socket or USB3.0 socket, it is only necessary to connect an interface converter for transforming TypeC socket into a USB2.0 plug or a USB3.0 plug to the TypeC interface of the peripheral device, and then the peripheral device can be inserted into a corresponding socket of the processing device, the processing device can download the program and then compress and encode the second audio and video data output to the first display monitor into the USB2.0 data and output the USB2.0 data, and transmit the USB2.0 data to the peripheral device via the USB2.0 data transmission pins, thereby improving compatibility of the data transmission device.

Preferably, the memory 25 is a flash memory. The flash memory is a non-volatile internal storage, which can store data for a long time without a current supply. A storage property of the flash memory is equal to that of a hard click. Therefore, the flash memory, being a storage medium for various portable digital equipment, is particularly suitable for long-term storage of a program for the peripheral device.

On the basis of the above-mentioned various solutions, the present embodiment provides a further modified optional solution, in which the TypeC interface also includes the power signal transmission pin $V_{BUS}$ as shown in FIG. 3; the microprocessor 24 also includes a power supply port for accessing a power source; the power signal transmission pin $V_{BUS}$ is configured to connect the power supply port of the processing device; the power signal transmission pin $V_{BUS}$ of TypeC interface 21 may connect to the power supply port of the microprocessor 24. That is, the processing device supplies power to the microprocessor 24. In this way, a power source is not necessarily configured in the peripheral device, and the volume of the peripheral device is reduced and the use convenience of the peripheral device is improved.

Further, the microprocessor 24 has a plurality of power supply ports; as shown in FIG. 2, the peripheral device also includes a power management unit 27 for converting a single input power signal into a plurality of power signal outputs with different voltage values; the power management unit, i.e. PMU, is a highly integrated power management solution directed to portable applications. The power management unit integrates several power management components which are conventionally discrete, into a single encapsulated component, thereby achieving a higher power transformation efficiency and a lower power dissipation. The number of the elements can be reduced to fit a restricted board level space. The power management unit 27 is connected between the power signal transmission pin and the power supply port of the microprocessor 24, where a input port of the power management unit 27 is connected with the power signal transmission pin, and a plurality of output ports of the power management unit 27 are correspondingly connected with a plurality of power supply ports of the microprocessor 24. Since the microprocessor 24 can perform treatments to many functional programs, and different functional programs may require different power-on sequences and powers, different values of voltages can be output by introducing the power manage module 27, and the output sequence of voltages can be controlled, to meet various demands of the microprocessor 24. For example, as shown in FIG. 2, the power manage unit 27 outputs voltages of 1.5 V, 1.8 V, 3.3 V or 1 V.

On the basis of the above-mentioned solution, the present embodiment also provide a further modified optional solution, in which the peripheral device also includes a first transformation IC23 for transforming an DP video data input into an MIPI video data and outputting the MIPI video data. The first transformation IC23 is connected between the differential signal transmission pin and the first data input port of the microprocessor 24, where an input port of the first transformation IC23 is connected to the differential signal transmission pin, and an output port of the first transformation IC23 is connected to the first data input port of the microprocessor 24. Since currently, the types of the microprocessor that can be used for transmitting the video data are relatively few in the market, and the types of the port that can be supported by the microprocessor are also relatively few, MIPI port is one of the microprocessor port that is relative widely used, and the transformation IC for transforming the DP video data into the MIPI video data is also relative widely used, therefore, the first data input port is MIPI port, and the DP video data is transformed into the MIPI video data and output to the microprocessor 24 via the first transformation IC23, thereby making the implementation of the technical solutions provided in the present disclosure be more convenient for the technologists in the field.

Generally, the first transformation IC23 needs a power supply. In order to reduce the energy consumption, the peripheral device also includes a power supply unit 26, in which a DC-DC (direct current to direct current) circuit and/or a LDO (low dropout regulator) circuit can be included. An input port of the power supply unit 26 is connected with the power signal transmission pin of the TypeC interface 21, and an output port thereof is connected with the power supply port of the first transformation IC23.

Preferably, the first audio and video data being compressed and encoded via the microprocessor 24 are audio and video data in the H264, H265 or MPEG format.

As described above, currently, the types of the microprocessor that can be used for transmitting the video data are relatively few in the market. In the present embodiment, an network IP camera processor is preferably taken as the microprocessor 24. The network IP camera processor is a widely used microprocessor for transforming video data in the communication network, which can implement a function of compressing and encoding, and is embedded with an operating system based on the Web, making the video data can be transmitted to end-user via the network.

Preferably, the wireless module is a Wi-Fi unit. The Wi-Fi unit is a common mean for establishing LAN. By way of using the Wi-Fi unit, the usability of the peripheral device can be improved.

Further, the microprocessor 24 is also configured to provide a second operating system to implement the pairing management of the Wi-Fi unit.

FIG. 4 is a structural schematic diagram of another implementation of a peripheral device provided by embodiments of the present disclosure.

In this implementation, the first transformation IC of the above-mentioned solution is substituted by a second transformation IC 28 and a third transformation IC 29, where the second transformation IC 28 is configured to transform the DP video data input into the HDMI video data and output the HDMI video data, and the third transformation IC 29 is configured to transform the HDMI video data input into the BT1120 data or the BT656 data and output the BT1120 data or the BT656 data. The second transformation IC 28 and the third transformation IC 29 are connected between the differential signal transmission pin and the first data input port of the microprocessor 24, where an input port of the second transmission IC 28 is connected with the differential signal transmission pin, an output port of the second transmission IC 28 is connected with an input port of the third transmission IC, and an output port of the third transformation IC29 is connected with the first data input port of the microprocessor 24. A BT1120 port or a BT656 port is a common port of the microprocessor 24, the second transmission IC 28 and the third transformation IC 29 are relative widely used. Therefore, the implementation as shown in FIG. 4 provides another solution for improving the usability of the peripheral device.

Optionally, the structural schematic diagram of a peripheral device as shown in FIG. 4 also includes the power supply unit 26, the power management unit 27 or the flash memory 25, the corresponding connection structures and functions thereof can refer to the above-mentioned configuration of the technical solution corresponding to FIG. 2.

In conclusion, according to the technical solution of the embodiments of the present disclosure, the peripheral device includes the screen data receiving port through which the screen data of the processing device can be directly obtained, and the wireless module through which the screen data can be transmitted to the communication network. When the peripheral device is inserted into the processing device, the peripheral device can automatically obtain the screen data being output to the display monitor via the processing device, and transmit the screen data to the communication network, therefore, the screen transmission to other network nodes in the communication network for displaying can be achieved without installing a driver. Compared with transferring the compressed and encoded data to the wireless module by using the USB interface in the prior art, embodiments of the present disclosure have benefits of driver-free screen transmission, shortening the preparation time for screen transmission and avoiding consuming resources of the processing equipment. The driver-free screen transmission is to implement the screen transmission without modifying the processing device inserted with the peripheral device. In a multi-party conference, through avoiding installing a driver to modify the personal computers of the participators, on the one hand, the screen efficiency can be improved, and on the other hand, the safety of the personal computers of the participators can be ensured. In addition, according to the technical solution of the present embodiments, many optional solutions are provided based on taking the screen receiving port as the differential signal transmission pin of the TypeC interface. By using various functional pins of the TypeC interface, not only the compatibility is improved, but also the functions of the peripheral device are enriched.

Figure 5:
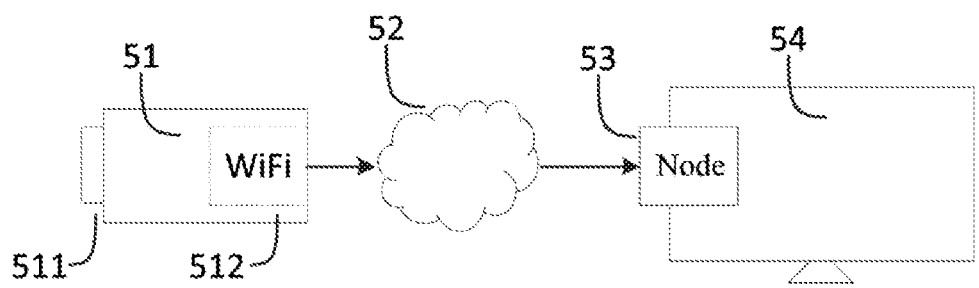
FIG. 5 is a structural schematic diagram of an implementation of a conference tool according to an embodiment of the present disclosure.

FIG. 5 is a structural schematic diagram of an implementation of a conference tool provided by embodiments of the present disclosure. The conference tool provided in the present embodiment includes a display device node 53, a second display monitor and at least one of the peripheral device provided by any embodiments of the present disclosure, where the peripheral device includes at least the screen data receiving port 511 and the wireless module 512.

The display device node 53 is connected with the second display monitor 54; the display device node 53 is configured to pair with the peripheral device 51 in the wireless communication network 52, receiving the audio and video data from the peripheral 51, and controlling the second display monitor 54 to display the media content corresponding to the audio and video data.

The audio and video data referred to in the above-mentioned technical solution of the embodiments of the present disclosure may be the first audio and video data, the second audio and video data or the third audio and video data transmitted and processed via the terminal device and the peripheral device.

Since the conference tool includes the peripheral device 51 provided by the embodiments of the present disclosure, the conference tool as shown in FIG. 5 may have corresponding beneficial effects.

Further, the conference tool provided in the embodiments of the present disclosure, on the basis of that as shown in FIG. 5, may also include a input device, through which user can implement a user operation for triggering the display of the media content corresponding to the audio and video data on the second display monitor. For example, the second display monitor 54 is the large-screen display device for conference, the input device may be a touch control panel disposed on the large-screen display device. Users can switch display signal sources of the large-screen display device by a touch operation on the touch control panel, to make the large screen to display the media content corresponding to the screen data received via the display device node 53.

Figure 6:
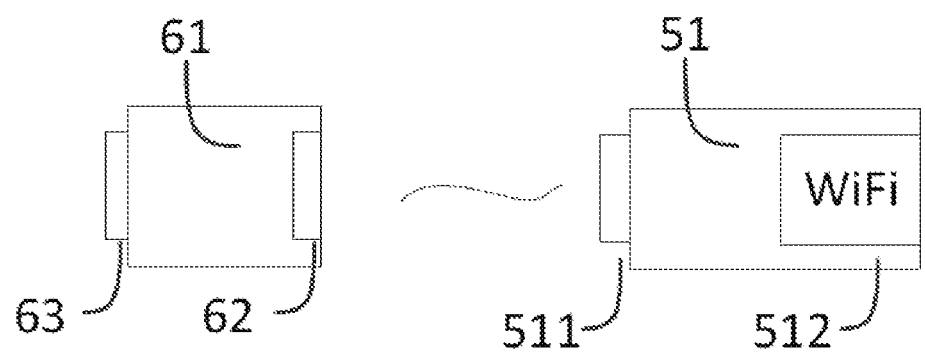
FIG. 6 is a structural schematic diagram of another implementation of a conference tool according to an embodiment of the present disclosure.

FIG. 6 is a structural schematic diagram of another implementation of the conference tool provided by embodiments of the present disclosure. The conference tool includes the peripheral device 51 and an interface converter 61; the peripheral device 51 includes a TypeC plug 511, the microprocessor (not shown in FIG. 6), and the wireless module 512; the interface converter 61 includes a TypeC socket 62 and a USB plug 63, where the USB plug is USB2.0 plug or USB3.0 plug. As shown, the interface converter 61 is configured to transform a TypeC socket 62 into a USB plug 63, therefore, the TypeC socket 62 is paired and connected with the pins of the USB plug 63 which have the same function as that of the TypeC socket 62.

The TypeC plug 511 of the peripheral device 51 is configured to connect the TypeC socket of the terminal device or the TypeC socket 62 of the interface converter 61; the USB plug 63 of the interface converter 61 is configured to connect the USB socket of the terminal device; the USB socket is a USB2.0 socket or a USB3.0 socket.

The microprocessor includes the first data input port, the second data input port and the wireless module connection port; the differential signal transmission pins in the TypeC plug 511 of the peripheral device 51 are configured to obtain the first audio and video data output from the terminal device via the TypeC socket; generally, the first audio and video data output via the TypeC socket is the DP video data; the first data input port of the microprocessor is connected with the differential signal transmission pins in the TypeC plug 511, the microprocessor is configured to compress and then transmit the first audio and video data to the wireless module connection port for outputting.

The USB2.0 data transmission pin of the TypeC interface 21 is configured to obtain the USB2.0 data output from the terminal device via the TypeC socket or the USB socket; the second data input port of the microprocessor is connected with the USB2.0 data transmission pin of the TypeC plug 511; the microprocessor is also configured to encode the USB2.0 data received via the second data input port to get the third audio and video data, the third audio and video data is output via the wireless module connection port.

The wireless module connection port is connected with the wireless module 512; the wireless module 512 is configured to communicate with the communication network, and transmit the screen data from the microprocessor to the network node in the communication network which is paired with the microprocessor. That is, the wireless module 512 can receive the third audio and video data, which is obtained by encoding the USB2.0 data output from the terminal device via the USB socket, and can also receive the first audio and video data, which is output from the terminal device via the TypeC socket and compressed and encoded by the microprocessor, and transmit the third audio and video data or the first audio and video data into the wireless communication network. If the terminal device has the TypeC socket, the first audio and video data is transmitted to the wireless communication network, after the format of the first audio and video data being transformed and the first audio and video data being compressed. If the terminal device has no TypeC socket, by way of the transformation via the interface converter 61, after the USB2.0 data transmission pin of the peripheral device obtains the USB2.0 data, the USB2.0 data is parsed into the third video and audio data according to a preset encoding and decoding rules. Therefore, a conference tool with a high compatibility is provided in the present embodiments. Via the conference tool, the screen data of the terminal device with the USB socket or the TypeC socket can be obtained and transmitted to the wireless communication network, and can be captured via the large-screen display device for conference in the wireless communication network, thereby implementing the wireless screen transmission.

Further, the conference tool also includes a memory configured to store the executable program, where the executable program is run by the first processor of the terminal device after being downloaded into the terminal device. The second audio and video data, which is currently output via the first processor to the first display monitor, is compressed by the first terminal device into the USB2.0 data via the first processor. The USB2.0 data is output via the TypeC socket or the USB socket of the terminal device.

Further, the memory is integrated in the peripheral device 51; the microprocessor is also configured to obtain the executable program from the memory and output the executable program via the second data input port, when the microprocessor is trigged. The memory is integrated in the peripheral device 51, which can make it convenient for the terminal device to download program, and for the terminal device only having the USB socket, the preparation time for obtaining the screen data can also be reduced, and the rate of wireless screen transmission can be improved.

Further, the wireless module 512 is also configured to receive the screen control signal transmitted via the network node in the communication network which is paired with the wireless module; the microprocessor is also configured to encapsulate the signal from the wireless module, which is input via the wireless module connection port, into a HID output signal, and output the HID output signal via the second data input port. According to the further solution, transmitting back of the screen control signal on the large-screen display device for conference can be implemented, so that the images of the terminal device can be controlled on the large-screen display device for conference, and the controlled screen data can be received.

As a preferred implementation, the peripheral device 51 also includes the first transformation IC for transforming the DP video data input into an MIPI video data and outputting the MIPI video data; the first transformation IC is connected between the differential signal transmission pins and the first data input port of the microprocessor, where the input port of the first transformation IC is connected to the differential signal transmission pin, and the output port of the first transformation IC is connected to the first data input port of the microprocessor 4.

The conference tool provided by the embodiments of the present disclosure includes the peripheral device provided by the embodiments of the present disclosure. Therefore, the conference tool has corresponding benefits. In addition, the conference tool provided in the embodiments of the present disclosure has a high compatibility.

Figure 7:
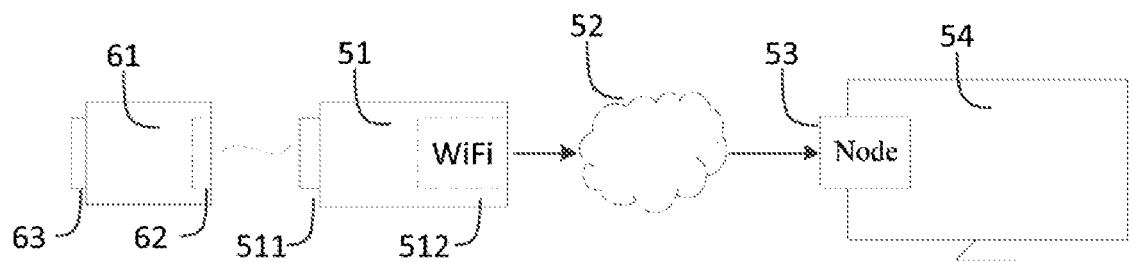
FIG. 7 is a structural schematic diagram of an implementation of a conference tool system according to an embodiment of the present disclosure.

FIG. 7 is a structural schematic diagram of an implementation of a conference tool system provided by embodiments of the present disclosure. The conference tool system includes the display device node 53, the second display monitor 54 and the conference tool provided in the above-mentioned implementation, which includes the peripheral device 51 and interface converter 61; the peripheral device 51 includes the TypeC socket 511, the microprocessor (not shown in FIG. 7) and the wireless module 512; the interface converter 61 includes the TypeC plug 62 and the USB plug 63, the USB plug 63 is the USB2.0 plug or the USB3.0 plug.

The display device node 53 is connected with the second display monitor 54; the display device node 53 is configured to pair with the peripheral device 51 in the wireless communication network 52, receive the audio and video data from the peripheral 51, and control the second display monitor 54 to display the media content corresponding to the audio and video data.

The conference tool system provided by embodiments of the present disclosure includes the conference tool provided in the embodiments of the present disclosure and, therefore, has the corresponding beneficial effects.

It should be noted that, in the case of without contradictions, combinations and associations of different embodiments or examples, and combinations and associations of different features of embodiments or examples described in the specification can be made by the person skilled in the art.

It should be noted that, the above-described content are merely preferred embodiments and technical principles applied. The person skilled in the art may appreciate that the present disclosure is not limited to the specific embodiments described herein, any obvious variation, modification and replacement may not depart from the scope of the disclosure. Therefore, although the present disclosure is described in details via the above-described embodiments, the present disclosure is not merely limited to the above-described embodiments. The present disclosure can also include more other equivalent embodiments, without departing from the spirit of the disclosure. The scope of the present disclosure should be subject to the appended claims.

What is claimed is:

1. A data transmission device, comprising a TypeC interface, a wireless module, a first data transformation chip and a microprocessor, wherein the TypeC interface is connected with the first data transformation chip, the first data transformation chip is connected with the TypeC interface and the microprocessor, and the microprocessor is connected with the wireless module, wherein the TypeC interface is configured to receive media data in a DisplayPort (DP) protocol format, and the media data is media content presented on a terminal device;

wherein the first data transformation chip is configured to receive the media data in the DP protocol format transmitted through the TypeC interface, and further have the media data encoded into data in a first format;

wherein the microprocessor is configured to receive the data in the first format, further compress and encode the data in the first format into data in a second format; and wherein the wireless module is configured to transmit the data in the second format to a data receiving device.

2. The data transmission device according to claim 1, further comprising a trigger device configured to receive a first user operation, wherein the first user operation is a screen transmission trigger signal, and wherein the first user operation is used for triggering the microprocessor to transform the data in the first format into the data in the second format, and trigger the wireless module to transmit the data in the second format.

3. The data transmission device according to claim 2, wherein, the microprocessor is further configured to discard the received data in the first format prior to receiving the first user operation by the trigger device.

4. The data transmission device according to claim 1, wherein the TypeC interface comprises at least one pair of differential signal transmission pins configured to receive the media data in the DP protocol format.

5. The data transmission device according to claim 1, wherein the TypeC interface further comprises at least one pair of differential signal transmission pins, a paring communication pin configured to transmit a first request signal, and the first request signal is used for requesting the terminal device to transmit the media data in the DP protocol format to the at least one pair of differential signal transmission pins.

6. The data transmission device according to claim 5, wherein the paring communication pins are further configured to transmit a second request signal, wherein the second request signal is used for requesting the terminal device to supply power according to a power requirement of the data transmission device.

7. The data transmission device according to claim 1, wherein the data in the first format comprises video data in an MIPI format and/or audio data in an I2S format.

8. The data transmission device according to claim 1, wherein the data in the second format comprises video data in an H.264/H.265 format and/or audio data in an AAC format.

9. The data transmission device according to claim 1, wherein the TypeC interface further comprises a USB2.0 data transmission pin connected with the microprocessor.

10. The data transmission device according to claim 9, wherein the wireless module is further configured to receive a touch signal from a communication network, and transmit the touch signal to the terminal device via the USB2.0 data transmission pin.

11. The data transmission device according to claim 10, wherein the microprocessor is further configured to encapsulate the touch signal received by the wireless module from the communication network, into a signal in an HID format.

12. The data transmission device according to claim 2, further comprising a memory connected with the microprocessor, wherein the memory is stored with an executable program, the executable program is configured to run after being downloaded to the terminal device, and the executable program is further configured to trigger, when the terminal device is running, the terminal device to obtain the media content, and trigger the terminal device to compress and encode the obtained media content into a USB2.0 data, and wherein the microprocessor is configured to obtain the executable program from the memory when being triggered, and transmit the executable program to the terminal device; the microprocessor is further configured to transmit the received USB2.0 data through the wireless module.

13. The data transmission device according to claim 1, further comprising a second data transformation chip through which the first data transformation chip is connected to the microprocessor.

14. A data transmission method, comprising:

receiving, via a power pin of a TypeC interface, a base working power, the base working power provides a power for functioning;

receiving an inquiry data packet transmitted by a terminal device via the TypeC interface thereof;

transmitting a response to the terminal device via the TypeC interface, wherein the response carry's information indicating capability of supporting for a DisplayPort (DP) protocol format;

receiving, via signal transmission pins, media data in the DP protocol format sent from the terminal device, wherein the media data comprises at least one of video data or audio data presented on the terminal device;

compressing the media data according to a preset encoding scheme; and transmitting the compressed media data via a wireless network to a data receiving device.

15. The data transmission method according to claim 14, wherein the inquiry data packet is a VDM signal; and wherein the response carry's information indicating that a current operation mode is a DP mode.

16. The data transmission method according to claim 14, wherein the compressing the media data according to a preset encoding scheme further comprises:

compressing the media data in the DP protocol format into data in an H.264/H.265 format and/or data in an AAC format.

17. The data transmission method according to claim 16, prior to the compressing the media data in DP protocol format into the data in the H.264/H.265 format and/or the data in the AAC format, further comprising:

receiving a screen sharing instruction.

18. The data transmission method according to claim 14, wherein the compressing the media data according to a preset encoding scheme further comprises:

converting the media data in the DP protocol format into video data in an MIPI format and/or audio data in an I2S format, and then compressing the video data in the MIPI format and/or the audio data in the I2S format into data in the H.264/H.265 format and/or data in the AAC format.

19. The data transmission method according to claim 18, prior to the compressing the video data in the MIPI format and/or the audio data in the I2S format into the data in the H.264/H.265 format and/or the data in the AAC format, further comprising:
receiving a screen sharing instruction.

20. The data transmission method according to claim 14, further comprising:
receiving a touch signal from the data receiving device, and transmitting the touch signal to the terminal device, so that the terminal device performs a corresponding operation according to the touch signal.

21. A method of transmitting data of a data transmission device wherein the data transmission device comprises a TypeC interface, a wireless module, a data transformation chip and a microprocessor, the TypeC interface is connected with the data transformation chip, the data transformation chip is connected with the TypeC interface and the microprocessor, and the microprocessor is connected with the wireless module, the TypeC interface comprises at least one pair of differential signal transmission pins, the method comprising:
receiving, via a power pin of the TypeC interface, a base working power;
receiving, by the data transmission chip, an inquiry data packet transmitted by to terminal device via the TypeC interface thereof;
transmitting, by the data transmission chip, a response to the terminal device via the TypeC interface, wherein the response carry's information indicating capability of supporting for DP mode;
receiving, by the data transformation chip, the media data in a DisplayPort (DPI protocol format via the at least one pair of differential signal transmission pins, wherein the media data comprise at least one of video data or audio data presented on a screen of the terminal device;
encoding, by the data transformation chip, the media data in the DP protocol format into video data in an MIPI format and/or audio data in an I2S format;
transmitting, by the data transformation chip, the video data in MIPI format and/or the audio data in I2S format to the microprocessor;
compressing, by the microprocessor, the video data in the MIPI format and/or the audio data in the I2S format into video data in an H.264/H.265 format and/or audio data in an AAC format; and
transmitting, by the microprocessor, the video data in the H.264/H.265 format and/or the audio data in the AAC format to a data receiving device.

22. A data transmission device, comprising a TypeC interface, a wireless module, a data transformation chip and a microprocessor, wherein the TypeC interface is connected with the data transformation chip, the data transformation chip is connected with the TypeC interface and the microprocessor, and the microprocessor is connected with the wireless module, the TypeC interface comprises at least one pair of differential signal transmission pins,
wherein the TypeC interface comprises a power pin for receiving a base working power,
wherein the data transmission chip is configured to receive an inquiry data packet transmitted by a terminal device via the TypeC interface thereof,
wherein the data transmission chip is configured to transmit a response to the terminal device via the TypeC interface, wherein the response carry's information indicating capability of supporting for a DisplayPort (DP) protocol format,
wherein the data transmission chip is configured to receive the media data in the DP protocol format via the differential signal transmission pins, wherein the media data comprise at least one of video data or audio data presented on the terminal device,
wherein the data transmission chip is configured to have the media data in the DP protocol format encoded into video data in an MIPI format and/or audio data in an I2S format,
wherein the data transmission chip is configured to transmit the video data in MIPI format and/or the audio data in I2S format to the microprocessor,
wherein the microprocessor is configured to compress the video data in the MIPI format and/or the audio data in the I2S format into video data in an H.264/H.265 format and/or audio data in an AAC format, and
wherein the microprocessor is configured to transmit the video data in the H.264/H.265 format and/or the audio data in the AAC format to a data receiving device.

* * * * *